United States Patent [19]

Koivunen

[11] Patent Number: 4,539,866
[45] Date of Patent: Sep. 10, 1985

[54] CONTINUOUSLY VARIABLE TRANSMISSION

[75] Inventor: Erkki A. Koivunen, Livonia, Mich.

[73] Assignee: General Motors Corporation, Detroit, Mich.

[21] Appl. No.: 548,325

[22] Filed: Nov. 3, 1983

[51] Int. Cl.³ .............................................. F16H 37/06
[52] U.S. Cl. .................................. 74/665 GE; 74/689; 74/701
[58] Field of Search ................. 74/681, 689, 694, 700, 74/701, 665 B, 665 C, 665 GE

[56] References Cited

U.S. PATENT DOCUMENTS

| | | | |
|---|---|---|---|
| 2,621,545 | 12/1952 | Karig | 74/745 |
| 2,833,160 | 5/1958 | Morgan | 74/681 |
| 3,031,893 | 5/1962 | Doleschalek | 74/745 X |
| 3,203,277 | 8/1965 | General | 74/689 |
| 3,340,749 | 9/1967 | Magg et al. | 74/689 |
| 3,479,908 | 11/1969 | Kress et al. | 74/689 X |
| 3,850,050 | 11/1974 | Lemmens | 74/689 |
| 3,924,480 | 12/1975 | Carapellucci | 74/689 |
| 4,136,581 | 1/1979 | Winter et al. | 74/689 |
| 4,304,150 | 12/1981 | Lupo et al. | 74/677 |
| 4,342,238 | 8/1982 | Gardner | 74/689 |
| 4,458,558 | 7/1984 | Frank | 74/689 X |

FOREIGN PATENT DOCUMENTS 0004130 9/1979 European Pat. Off. .

Primary Examiner—Allan D. Herrmann
Assistant Examiner—Joseph M. Rolnicki
Attorney, Agent, or Firm—Donald F. Scherer

[57] ABSTRACT

A continuously variable transmission with wide ratio coverage has a variable ratio belt drive in series with a fixed ratio drive which is selectively connectible between the input and output shafts. A pair of selectively engageable clutches cooperate with the belt drive to provide two continuously variable speed ratio ranges. A transition clutch maintains power flow between the input and output shafts during shifting from one range to the other. The belt drive is controlled between the maximum and minimum drive ratios in each speed range. The belt ratio is held constant while the transition clutch is engaged.

3 Claims, 4 Drawing Figures

CONTINUOUSLY VARIABLE TRANSMISSION

This invention relates to continuously variable ratio transmissions and more particularly to such transmissions having more than one ratio range.

It is an object of this invention to provide an improved continuously variable transmission having two ratio ranges wherein the transmission includes a variable belt drive having two adjustable pulley members connectible between the transmission input and output shafts in series with a mechanical ratio and wherein the transmission also includes a pair of clutches effective to place the mechanical ratio after the belt drive in one range and before the belt drive in the other range.

It is another object of this invention to provide an improved continuously variable ratio transmission wherein a variable ratio belt drive is connectible between the input and output members of a transmission in such a manner as to provide power flow in one direction during a low range and in the opposite direction during a high range and wherein a transition clutch maintains the power flow during an interchange between the ranges.

It is a further object of this invention to provide an improved continuously variable transmission wherein a variable ratio belt drive includes a pair of adjustable pulleys each having a power transmitting shaft selectively connectible independently with both the transmission input and output shafts through a pair of mechanical clutches so that the power flow will be transmitted between the pulleys in one direction during a first drive range and in the opposite direction during a second drive range while the transmission power flow is in one direction only between the transmission input and output shafts and wherein a selectively operable friction clutch maintains the power flow in the one direction between the transmission shafts while the mechanical clutches are interchanged.

These and other objects and advantages of the present invention will be more apparent from the following description and drawings in which.

Figure 1:
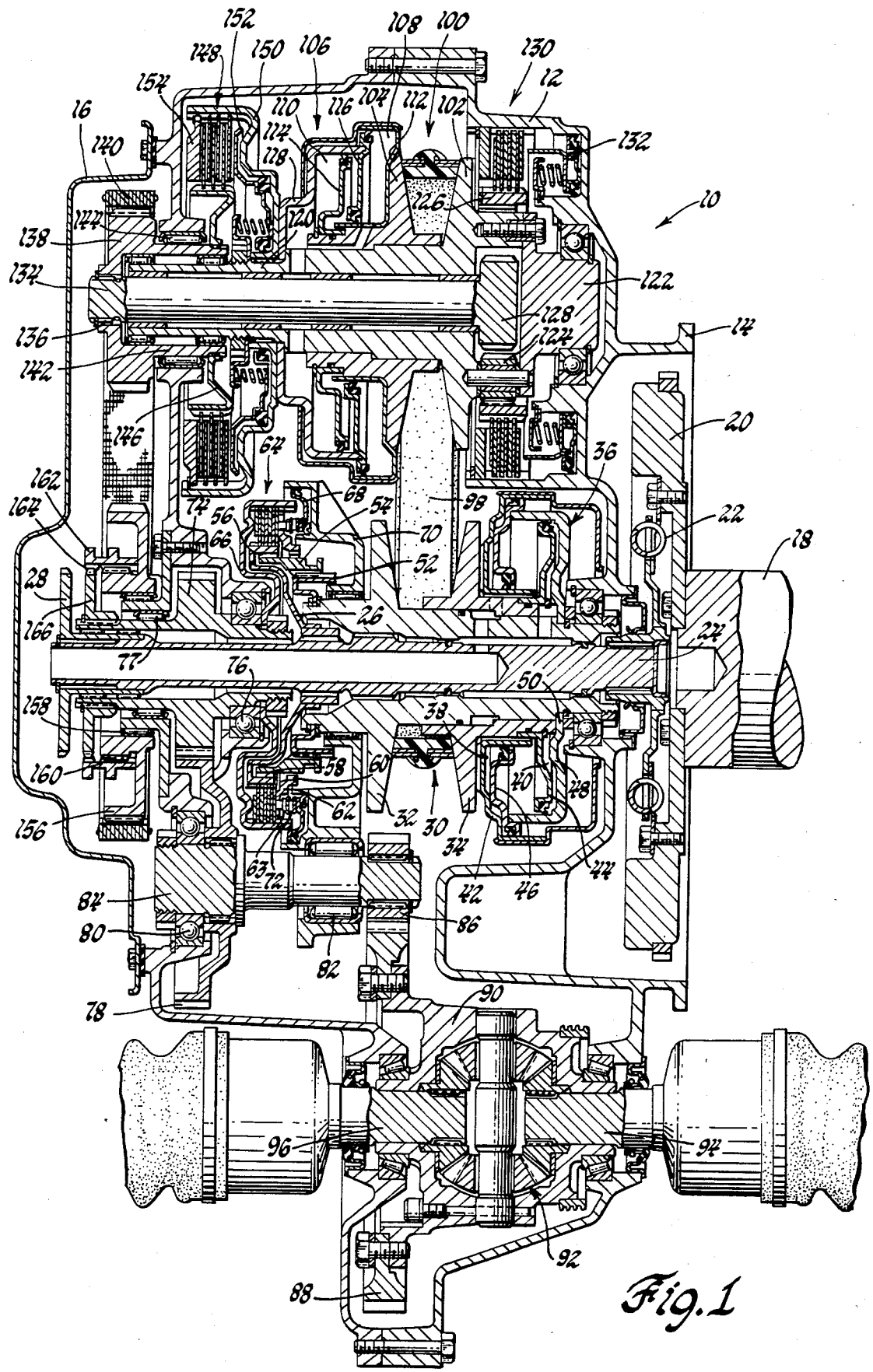
FIG. 1 is a cross-sectional elevational view of a transmission incorporating the present invention.

Referring to FIG. 1, there is seen a power transmission 10 which includes a multi-piece housing 12 which is adapted to be secured to an engine, not shown, by a flange 14. The housing 12 is closed at the left side by a pan or cover 16. The transmission 10 receives input power from an engine shaft 18 which is drivingly connected through a flywheel 20 and vibration damper 22 to a transmission input shaft 24.

The transmission input shaft 24 extends the length of the transmission and has a centrally disposed clutch hub portion 26 and a mechanical clutch portion 28 which is formed as an externally splined member and connected to the input shaft 24. Rotatably disposed on the input shaft 24 is an adjustable pulley 30 which includes a fixed sheave or pulley half 32 and a movable sheave or pulley half 34. The movable pulley half 34 is controlled by a hydraulic actuator 36 which is preferably of the double piston variety. The actuator 36 has two hydraulic cylinder chambers 38 and 40 which may be filled with pressurized fluid acting on a pair of piston members 42 and 44 which are operable to position the movable sheave 34.

The cylinders 38 and 40 are closed by the walls 46 and 48, respectively, which are grounded or otherwise secured at 50 to the fixed sheave 32. The operation of hydraulic control actuators, such as that shown herein, are well known. The fixed sheave 32 has drivingly connected thereto a clutch hub 52 on which is slidably supported a clutch sleeve 54. The clutch sleeve 54 is drivingly connected to the clutch hub 52. The output periphery of clutch sleeve 54 has formed thereon a spline or drive portion 56 which is selectively connectible with a spline 58 formed on hub 26 or with a spline 60 formed on a plate 62.

A transition clutch, generally designated 64, includes a clutch housing 66 in which is disposed a plurality of friction plates. The friction plates are alternately splined between clutch hub 26 and housing 66. When it is desired to engage the transition clutch 64, the friction plates are brought into abutment by pins 63 which are acted on by a nonrotating piston 68 slidably disposed in a housing portion 70 and separated from the rotating pins 63 by a needle roller bearing 72. When the transition clutch 64 is engaged, the input shaft 24 is drivingly connected directly to the clutch housing 66.

The transfer plate 62 is also splined to the clutch housing 66 such that when the clutch sleeve 54 is moved rightward, the spline 56 will engage the spline 60 thereby providing a drive connection between the pulley 30 and the clutch housing 66.

The clutch housing 66 is secured to a gear member 74 which is rotatably supported in the housing 12 through a ball bearing 76 and needle bearing 77 and meshes with a gear 78 which is also rotatably mounted in the housing 12 through a ball bearing 80 and a needle roller bearing 82. The gear 78 is secured to a shaft member 84 on which is drivingly secured a gear 86 which meshes with a differential input gear 88.

The gears 74 and 78 provide a fixed gear ratio between clutch housing 66 and shaft 84. The gears 84 and 86 also provide a fixed drive ratio which is normally termed the final drive ratio. The gear 88 is secured to a conventional differential housing 90 in which is disposed a conventional bevel type differential gear unit 92 having a pair of output shafts 94 and 96 adapted to drive the vehicle wheels.

In the configuration shown, the transmission 10 can be considered to be a transaxle and is readily adaptable for use in transverse front wheel drive packages. However, the invention is not limited to this specific application.

The pulley 30 frictionally engages a belt member 98 which also frictionally engages an adjustable pulley 100. The pulley 100 includes a fixed sheave or pulley 102 and a movable sheave or pulley 104. The movable sheave 104 is controlled by a hydraulic actuator 106 having a pair of control cylinder chambers 108 and 110 which are filled with pressurized fluid to operate on pistons 112 and 114, respectively. The cylinders 108 and 110 are closed by end walls 116 and 118 which are secured to a shaft 120 which is an extension of fixed sheave 102.

The hydraulic actuator 106 operates in concert with actuator 36 to provide the desired drive ratio between the variable pulleys 30 and 100. The use of such hydraulic controls is well known. For example, the total working area of actuator 106 can be designed to be greater than the total working area of actuator 36 such that a fixed pressure can be maintained in actuator 36 and a variable pressure can be utilized in actuator 106 to control the drive ratio.

If the pressure in actuator 106 is decreased, the actuator 36 will be operable to move pulley members 32 and 34 closer together thereby forcing the belt 98 to move radially outward while simultaneously causing the belt 98 to move radially inward at pulley 100.

The radially inward movement of belt 98 will cause separation of sheaves 102 and 104. When the desired drive ratio between the pulleys is achieved, the pressure in actuator 106 can be controlled to provide the proper balance to maintain the ratio thus established.

The fixed sheave 102 is secured to a planetary gear carrier 122 which has rotatably supported thereon a plurality of intermeshing planetary pinions. A plurality of the pinions 124 mesh with a ring gear 126 while a second group of pinions, not shown, mesh with a sun gear 128. This provides a conventional compound planetary gear set.

The ring gear 126 is selectively connectible with the transmission housing 12 through a fluid operated friction brake 130 which includes a selectively fluid actuated piston 132 and a plurality of interleaved friction discs. Such fluid brakes are well-known and it is not considered that a detailed description is necessary. When the brake 130 is engaged or actuated, the sun gear 128 will be driven in a direction opposite to the direction of rotation of pulley 100 such that a reverse drive between the pulley 100 and sun gear 128 is provided.

The sun gear 128 has secured thereto or otherwise integrally formed therewith a shaft 134 which has a spline at 136. The spline 136 provides a drive connection for a sprocket member 138 which meshes with the conventional chain member 140. The sprocket 138 has a shaft portion 142 which is rotatably supported in the housing 12 by needle bearing 144 and is drivingly connected to a clutch hub 146. The clutch hub 146 is a component of a fluid actuated friction clutch 148, which has a housing 150, a fluid operated piston 152, a back up plate 154 and a plurality of interleaved friction discs which are selectively connectible between the housing 150 and the hub 146.

The housing 150 is drivingly connected to the shaft extension 120 of pulley 100 such that the housing 150 rotates in unison with the pulley 100. When the friction clutch 148 is engaged, the sprocket 138 will rotate in the same direction as pulley 100 and this is considered the forward direction. Thus, the clutch 148 is considered to be a forward clutch while the brake 130 is considered to be a reverse brake.

The chain 140 also meshes with a sprocket 156 which is rotatably supported on a portion of housing 12 through a needle bearing 158. The sprocket 156 has a spline or gear portion 160 on which is slidably disposed a clutch sleeve 162. The clutch sleeve 162 is drivingly connected to the spline or gear 160 and further includes a spline or gear portion 164 which is selectively connectible with a gear 166 or with the clutch portion 28.

The gear 166 is drivingly connected to the gear 74. Thus, in the position shown, the chain drive includes sprockets 138 and 156 and chain 140 are drivingly connected to the gear 74. If the clutch sleeve 162 is moved leftward, the gear 156 and therefore the chain drive are connected with the clutch portion 28 and therefore with the transmission input shaft 24.

The operation of the transmission will be described by reference to the FIGS. 2 through 4. The pertinent mechanical components in FIGS. 2 through 4 will be given the same numerical designation which designate the corresponding parts in FIG. 1. The relative positioning of these components in these FIGS. 2 through 4 may be slightly different from those shown in FIG. 1, however, the operation thereof is the same.

Figure 4:
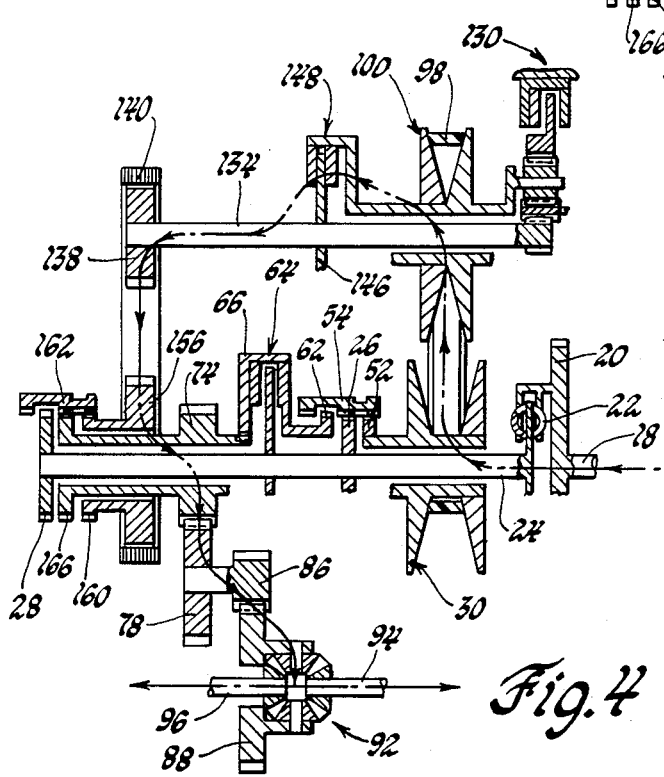
FIG. 4 is a diagrammatic representation showing the transmission in the low range mode of operation.

In FIG. 4, the transmission is conditioned for the low range of operation. The mechanical clutch comprised of sleeve 54 is operable to connect pulley 30 with input shaft 24 while the mechanical clutch comprised of sleeve 162 is operable to connect the chain drive to gear 74 and therefore the transmission output shafts 94 and 96. The pulleys 30 and 100 are conditioned at the maximum underdrive ratio such that maximum torque transmission will be achieved. To start the vehicle moving, the clutch 148 is engaged. In the alternative, a centrifugal type input clutch could be utilized.

The operation in the low range can be accomplished at a fixed engine speed. At a given engine speed, the vehicle output speed is controlled by adjusting the drive ratio between the pulleys 30 and 100 from the maximum underdrive shown in FIG. 4, toward the maximum overdrive shown in FIG. 2. When the maximum overdrive condition is reached, further increase in vehicle speed during low range operation can only be achieved by increases in engine speed.

Figure 2:
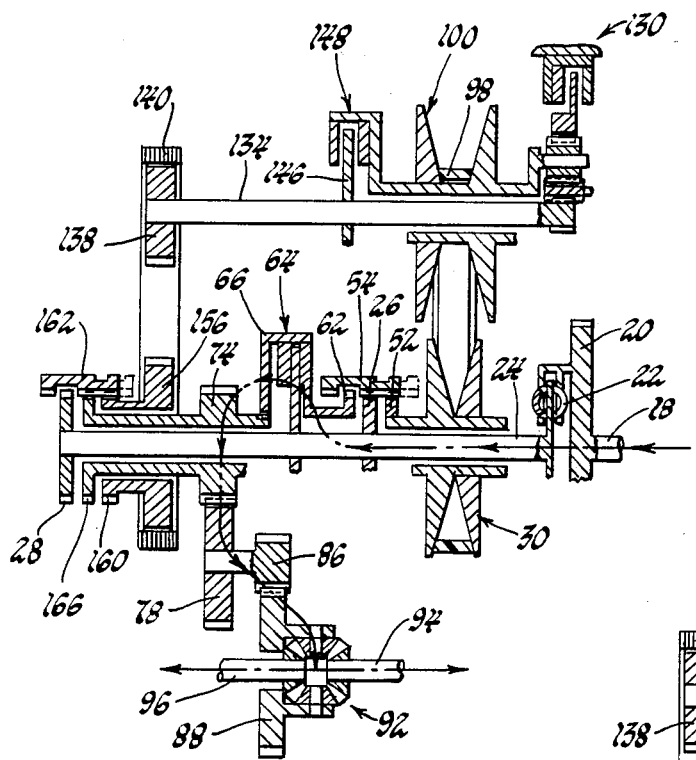
FIG. 2 is a diagrammatic representation of the transmission showing one mode of operation.

When the maximum overdrive ratio shown in FIG. 2 is achieved, the drive ratio from pulley 30 to pulley 100 is the inverse of the drive ratio provided by the chain 140 between sprockets 138 and 156. Therefore, the gear 74 is rotating at the same speed as input shaft 24. When this condition is present, the transition clutch 64 can be engaged. With the transition clutch engaged, the power flow from the input shaft 24 to the output shafts will be in the same manner signified by the arrows in FIG. 2.

During operation of the transition clutch, the clutch sleeve 54 can be moved from the solid position shown to the phantom position of FIG. 2 and the clutch sleeve 162 can be moved from the solid position to the phantom position shown in FIG. 2. These phantom positions correspond to the positions shown for sleeves 54 and 162, respectively, in FIG. 3.

Due to the synchronization of shift speeds during transition clutch operation, the clutch sleeves 54 and 162 can be shifted without gear clash. As seen in FIG. 3, the clutch sleeve 162 is operable to connect input shaft 24 to the chain drive while the clutch sleeve 54 is operable to connect pulley 30 through the clutch housing 66 to the gear 74 and therefore the transmission output shafts.

When the high ratio range is first established, the drive ratio between pulleys 30 and 100 will be as shown in FIG. 2. The drive ratio from pulley 100 to pulley 30 is a maximum underdrive ratio, however, the drive ratio through the chain drive is an overdrive ratio. If desirable during transition clutch operation, the clutch 148 can be disengaged. For high ratio operation, the clutch 148 is re-engaged and the transition clutch 64 is disengaged.

Figure 3:
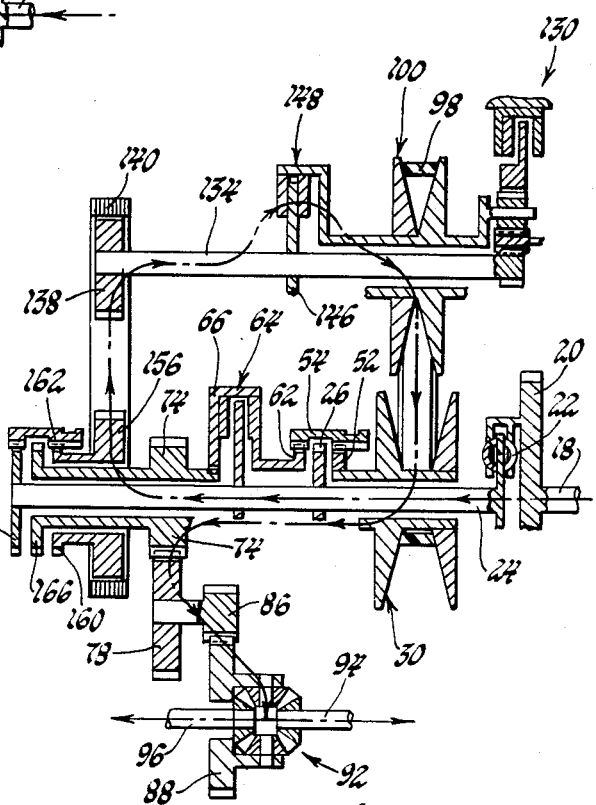
FIG. 3 is a diagrammatic representation of the transmission showing the high range mode of operation.

To provide an increase in vehicle speed during the high ratio range, the pulleys 30 and 100 are adjusted toward the maximum overdrive ratio from pulley 100 to pulley 30 as shown in FIG. 3. Vehicle speed decreases are accomplished by reducing the drive ratio of the pulley system toward the position shown in FIG. 2. Downshifting from the high ratio range to the low ratio range is accomplished in a manner similar to the upshift described above.

It is also possible to have a reverse drive ratio by starting the transmission as shown in FIG. 4 with the actuation of the forward brake 130 and release of the clutch 148. Speed increases are accomplished by appropriate manipulation of the belt drive ratio. High ratio range operation is also possible in reverse. However, in most vehicle applications, it is not believed that a high reverse ratio is desirable.

In accordance with the present invention, the high and low ratio ranges are accomplished by providing power flow through the pulley system and chain system in one direction for low range and in the opposite direction for high range while simultaneously maintaining constant power flow torque between the transmission input shaft and the transmission output shaft. The transition clutch is provided to maintain the power flow in the desired direction during the interchange from the low ratio range to the high ratio range.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A continuously variable power transmission comprising: an input means; an output means; variable ratio pulley and belt means operatively connectible between said input means and said output means and including a first adjustable pulley, a second adjustable pulley and a flexible drive member interconnecting said pulleys; first selectively engageable clutch means for connecting said first pulley to said input means during a first variable speed ratio range; second clutch means being selectively engageable for connecting said second pulley to said output means during the first variable ratio range; and a transitional clutch operable separately from said first and second clutch means and being selectively engageable for connecting said input means to said output means to transmit torque therebetween during the change from the first variable ratio range to a second variable ratio range, said first clutch means being shiftable for connecting said first pulley to said output means during engagement of said transition clutch for operation of said second variable ratio range, said second clutch means being shiftable for selectively connecting the second pulley to said input means during engagement of said transition clutch for operation during said second variable ratio range, and said variable ratio pulley means being controlled to provide a change in ratio between said first and second pulleys from an underdrive to an overdrive during said first variable ratio range and from an overdrive to an underdrive during said second variable ratio range.

2. A continuously variable power transmission comprising: an input means; an output means; variable ratio pulley and belt means operatively connectible between said input means and said output means and including a first adjustable pulley, a second adjustable pulley and a flexible drive member interconnecting said pulleys; fixed ratio chain drive means; selectively engageable friction means for connecting said chain drive means to said second adjustable pulley; first selectively engageable clutch means for connecting said first pulley to said input means during a first variable speed ratio range; second clutch means being selectively engageable for connecting said fixed ratio chain drive means to said output means during the first variable ratio range; and a transitional clutch operable independently of said first and second clutch means and being selectively engageable for connecting said input means to said output means to transmit torque therebetween during the change from the first variable ratio range to a second variable ratio range, said first clutch means being shiftable for connecting said first pulley to said output means during engagement of said transition clutch for operation of said second variable ratio range, said second clutch means being shiftable for selectively connecting said fixed ratio chain drive means to said input means during engagement of said transition clutch for operation during said second variable ratio range, and said variable ratio pulley means being controlled to provide a change in ratio between said first and second pulleys from an underdrive to an overdrive during said first variable ratio range and from an overdrive to an underdrive during said second variable ratio range.

3. A continuously variable power transmission comprising: an input means; an output means; variable ratio pulley and belt means operatively connectible between said input means and said output means and including a first adjustable pulley means, second adjustable pulley means including forwardreverse drive selection means operatively connectible with a flexible drive member interconnecting said pulleys; first selectively engageable clutch means for connecting said first pulley means to said input means during a first variable speed ratio range; second clutch means being selectively engageable for connecting said second pulley means to said output means during the first variable ratio range; and a transitional clutch being selectively engageable independently of said first and second clutch means for connecting said input means to said output means to transmit torque therebetween during the change from the first variable ratio range to a second variable ratio range, said first clutch means being shiftable for connecting said first pulley to said output means during engagement of said transition clutch for operation of said second variable ratio range, said second clutch means being shiftable for selectively connecting the second pulley to said input means during engagement of said transition clutch for operation during said second variable ratio range, and said variable ratio pulley means being controlled to provide a change in ratio from said first pulley means to said second pulley means from an underdrive to an overdrive during said first variable ratio range and to provide a change in ratio from said second pulley means to said first pulley means between an underdrive and an overdrive during said second variable ratio range.

* * * * *